US010486360B2

(12) United States Patent
Trivero

(10) Patent No.: US 10,486,360 B2
(45) Date of Patent: Nov. 26, 2019

(54) MACHINE FOR STRETCHING FILMS OR SHEETS

(71) Applicant: BRÜCKNER MASCHINENBAU GMBH & CO. KG, Siegsdorf (DE)

(72) Inventor: Gilbert Trivero, La Chavanne (FR)

(73) Assignee: BRÜCKNER MASCHINENBAU GMBH & CO. KG, Siegsdorf (DE)

(*) Notice: Subject to any disclaimer, the term of this patent is extended or adjusted under 35 U.S.C. 154(b) by 244 days.

(21) Appl. No.: 15/113,464

(22) PCT Filed: Jan. 14, 2015

(86) PCT No.: PCT/FR2015/000013
§ 371 (c)(1),
(2) Date: Jul. 22, 2016

(87) PCT Pub. No.: WO2015/110729
PCT Pub. Date: Jul. 30, 2015

(65) Prior Publication Data
US 2017/0001363 A1    Jan. 5, 2017

(30) Foreign Application Priority Data

Jan. 22, 2014 (FR) ...................................... 14 00122

(51) Int. Cl.
*B29C 55/16* (2006.01)
*B29C 55/20* (2006.01)
*B29K 105/00* (2006.01)
(52) U.S. Cl.
CPC ............ *B29C 55/165* (2013.01); *B29C 55/20* (2013.01); *B29K 2105/256* (2013.01)

(58) Field of Classification Search
CPC ............................... B29C 55/20; B29C 55/165
See application file for complete search history.

(56) References Cited

U.S. PATENT DOCUMENTS 2,880,998 A * 4/1959 Middleton .............. B29C 31/00
271/272
3,014,234 A * 12/1961 Koppehele ............ B29C 55/165
26/72
3,148,409 A * 9/1964 Bruckner .............. B29C 55/165
26/73
(Continued)

FOREIGN PATENT DOCUMENTS

CN        103201086 A    7/2013
JP            5-421 U    1/1993
(Continued)

OTHER PUBLICATIONS

Chinese Search Report (Application No. 201580005349.7) (1 page—dated Apr. 12, 2017).

*Primary Examiner* — Seyed Masoud Malekzadeh
*Assistant Examiner* — Taryn Trace Willett
(74) *Attorney, Agent, or Firm* — Renner Kenner Greive Bobak Taylor & Weber

(57) ABSTRACT

Machine for stretching films, comprising two tracks each having a first rail (1) on which clips (3) move and close together at a point for adjusting their pitch and a second rail (2) on which articulated carriages (5) move, in a chain driven by a toothed drive wheel (6), with two consecutive clips (3) respectively, characterised by a wheel (8) for indexing the point for adjusting the pitch of the clips (3).

6 Claims, 3 Drawing Sheets

(56) References Cited

U.S. PATENT DOCUMENTS

| | | | |
|---|---|---|---|
| 3,491,402 A * | 1/1970 | Koyama | B29C 55/165 |
| | | | 26/73 |
| 4,637,103 A | 1/1987 | Hutzenlaub | |
| 4,807,336 A * | 2/1989 | Yoshimura | B29C 55/20 |
| | | | 26/71 |
| 9,073,257 B2 * | 7/2015 | Sano | B29C 55/08 |
| 2009/0261503 A1 * | 10/2009 | Sano | B29C 55/045 |
| | | | 264/291 |
| 2012/0038080 A1 * | 2/2012 | Sano | B29C 55/08 |
| | | | 264/165 |
| 2012/0070528 A1 * | 3/2012 | Collin | B29C 55/10 |
| | | | 425/383 |

FOREIGN PATENT DOCUMENTS

| | | |
|---|---|---|
| JP | 2004-155138 A | 6/2004 |
| JP | 2004-322366 A | 11/2004 |
| JP | 2008-23775 A | 2/2008 |

\* cited by examiner

MACHINE FOR STRETCHING FILMS OR SHEETS

The present invention relates to machines for stretching films or sheets, in particular films made of plastic material and more particularly machines of this kind which simultaneously stretch a film. The invention applies in particular to simultaneous angular stretching. The preheated plastic material is stretched simultaneously in longitudinal direction and in transverse direction with a stretching angle in the stretched film which is other than 90°, for example 45°or 135°.

The simultaneous angular stretching is performed by means of a machine comprising two tracks. Each track has a first rail on which clips move which close at a point for adjusting their pitch. Each track comprises a second rail on which articulated carriages are moved in a chain driven by a toothed drive wheel. Each carriage is articulated respectively to two consecutive clips in such a way as to adjust the pitch of the clips, that is their mutual distance along the track. A stretching machine of this kind is disclosed for example in French patent 2 849 801.

Technical problems have affected the production of a machine of this kind. During production a change in the visual properties of the film has been noted. This sometimes results in the tearing of the film.

The invention overcomes these disadvantages with a machine for stretching films, made mainly of plastic material, of the type indicated above.

According to the invention, a mechanism for indexing the adjusting point of the pitch of the clips is formed on the one hand by a toothed indexing wheel, arranged downstream, in the direction of movement of the drive wheel of the chain, and driven at the same peripheral speed as the drive wheel and on the other hand by a roller of the carriage entering a tooth gap of the indexing wheel when the clip, further downstream in the direction of movement of the chain corresponding to said carriage, is at the pitch adjusting point of the clips.

It is now understood that angular stretching creates angular force components on the clips which wind up upstream of the stretching point up to the adjusting point of the pitch of the clips of the driven side. The pitch of the clips changes and over time there is a fluctuation in the stretching angle, resulting in a change in the visual properties of the film and occasionally its tearing. By means of a mechanism for indexing the pitch adjusting point of the clips said detrimental effects are fully corrected, provided that the indexing mechanism is insensitive to forces applied to the clips on stretching, being formed in particular independently of the rest of the machine, i.e. by an attached part which is not connected mechanically to the rest of the machine apart from performing the indexation.

The pitch is held fixed and this adjustment is performed outside of the stretching area of the film. In U.S. Pat. No. 3,148,409A, the entry of a chain roller joined to each clip in a tooth gap of the film side toothed wheel is not mentioned. In U.S. Pat. No. 3,491,402A FIGS. 8 and 9 define a change in state of the pitch of the clips between the two toothed wheels. At a first point, the pitch of the clips is at a maximum whilst at a second point the pitch of the clips is at a minimum. The wheel at the first point does not have a specific function of indexing the pitch of the clips, since the clips upstream of said wheel reach the maximum pitch.

Said wheel (at the first point) assumes a function of isolating the movement of the clips between their completely open state and completely closed state (wheel at second point) with a fixed relationship between the two wheels (chain). The wheel at the first point does not have the intermediate function of indexing the pitch of the clips. There is no definition of a selection of the pitch of intermediate clips other than the pitches of end clips without the factor of clipping the film. Furthermore, the variation in speed of the wheel at the first point cannot be adjusted during operation relative to the wheel (second point).

According to the invention, a precise control of the pitch of the clips is defined during the clipping of the film with a precision associated with the presence of the clip on the primitive diameter of the toothed wheel, whereas in U.S. Pat. No. 3,491,402A there is no definition of an flexible adjustment of the clipping of the film.

U.S. Pat. No. 3,014,234A does not discuss the management of clips between the area for taking up the film at the entry to the stretching oven and the stretching area of the film, since this patent only describes the principle of stretching the film and not the clipping thereof. The advantages of the invention relative to the machine described in U.S. Pat. No. 3,014,239A are:

Precision of the production of the film with increased precision of the pitch of the clips during the clipping of the film. The film is clipped and the clip is always indexed on the synchronisation wheel. The pitch of the initial fixed clip is respected without deviating from a possible angular stretching of the film originating from the stretching areas.

The quality of the stretched films depends mainly on the precision of the stretching which achieves the quality and respect of the properties of films. For this the precision of the clipping is of particular importance for the traverse and longitudinal stretching of the films.

The indexation of the pitch of clips of this previous document is performed by a device formed by a digit mounted on each clip associated with a screw with a variable pitch. Said device adapted solely to one stretching area cannot be adapted to a production line. With such a device, the parameterising of the variation of the pitch of the clip during production is not possible.

Speed of changing the pitch of clips with a compact wheel which can be rapidly replaced on dismantling the clips. A range of toothed wheels corresponding to the pitches of clips can thus be achieved in order to reduce the time required for changing the parameters.

The modification of the pitch of the clips in the previous document requires the complete dismantling of the clips, as well as the dismantling of the screw with variable pitch.

In general, according to the invention, the rails are vertical and the rollers of the carriage are on a vertical axis. The rollers are in particular rollers for rolling against the outer rail. The toothed indexing wheel has a vertical axis, like the toothed drive wheel. The machine has two toothed drive wheels and two toothed indexing wheels. The diameters of the indexing wheels perpendicular to the direction of movement of the chain are aligned. According to one embodiment a device is provided for mounting the indexing wheel making it possible to replace an indexing wheel with a given diameter by an indexing wheel of another diameter in order to be able to modify the pitch of the clip.

According to one embodiment, a ramp for closing the clips is mounted at the pitch adjusting point of the clips in a fixed manner on the frame of the machine.

The diameters of the two indexing wheels perpendicular to the rail can be colinear, but they can also be offset relative to one another in the direction of movement of the chain.

Preferably, the indexing wheel has at least 8 teeth. A fairly large number of teeth makes it possible to further adjust the clips per unit of time and adjust the pitch of the clips more easily.

FIG. 1 of the accompanying drawing is a plan diagram of part of a machine according to the invention.

Figure 1:
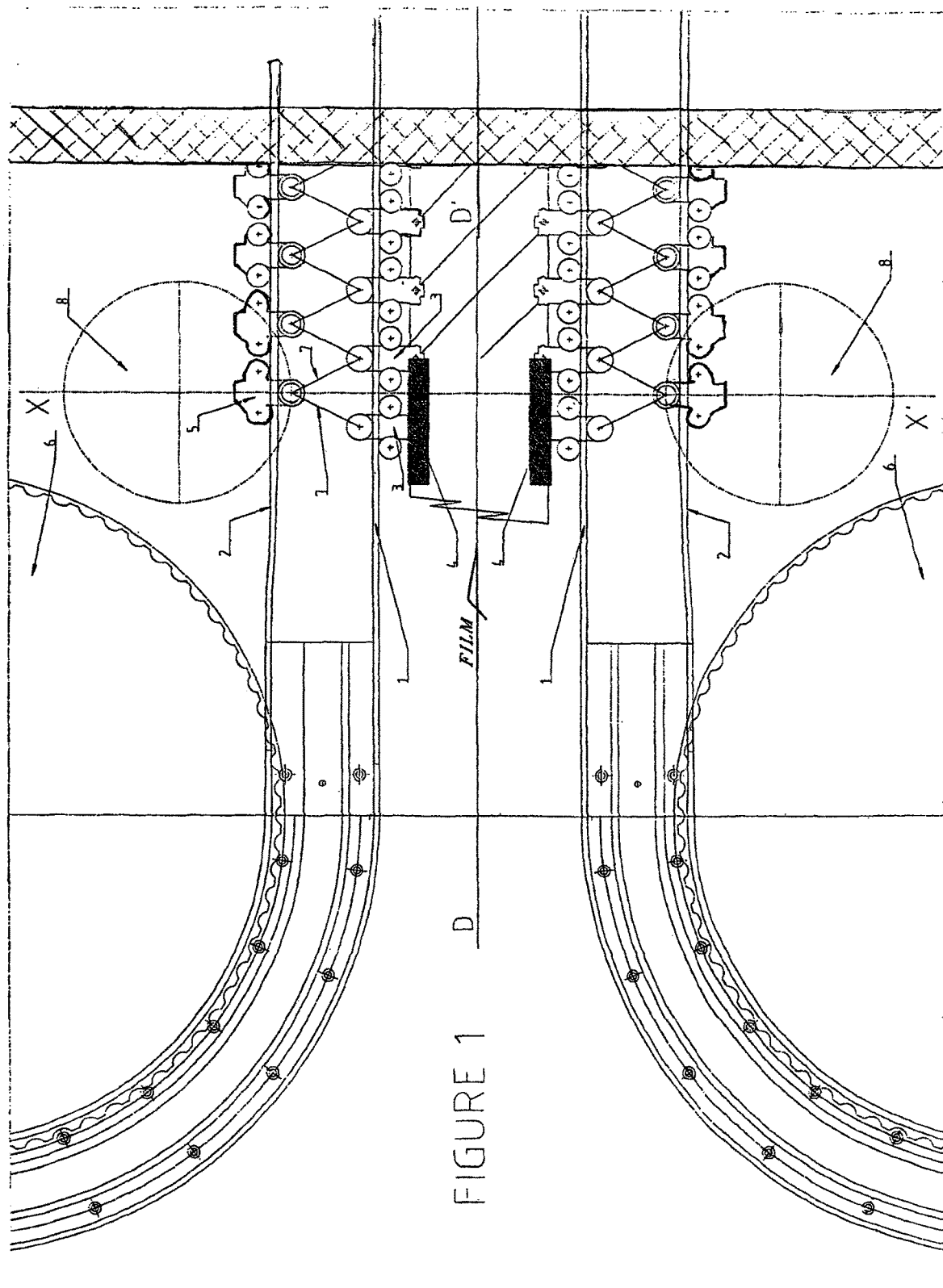

The machine for stretching film according to the invention has a temperature-controlled enclosure in which the two tracks run. Each track has a first inner rail 1 and a second outer rail 2 which are parallel, divergent or convergent relative to one another. The rails 1 and 2 are endless. On the first rail a multitude of clips 3 move which close at a point for adjusting the pitch below a fixed ramp 4 for closing clips. The film to be stretched is held at the two opposite edges by clips 3 which can be as described in French patent 2 686 041. Carriages 5 run on the second rail 2. The carriages 5 are articulated in a chain driven by a toothed wheel 6, arranged upstream of pitch adjusting point, with two consecutive clips 3 per two links 7 in such a way as to adjust the pitch of the clips 3, that is their mutual spacing, when the angle between the two links is changed. The carriages 5 run on a vertical roller against the outer rail 2.

According to the invention, as the indexing means for the pitch adjusting point of the clips 3 a toothed indexing wheel 8 is provided, arranged downstream in the direction of movement of the chain, of the wheel 6 and driven at the same peripheral speed as the wheel 6, the vertical roller of the carriage 5 entering into a tooth gap of the wheel 8 when the clip 3 further downstream in the direction of movement of the chain corresponding to said carriage 5 is at the pitch adjusting point. The wheel 8 thus controlled in speed does not eliminate the effects of stresses which are produced downstream as a result of the angular stretching of the film. The pitch of the clips remains the same over the period of operation of the machine.

Figure 2:
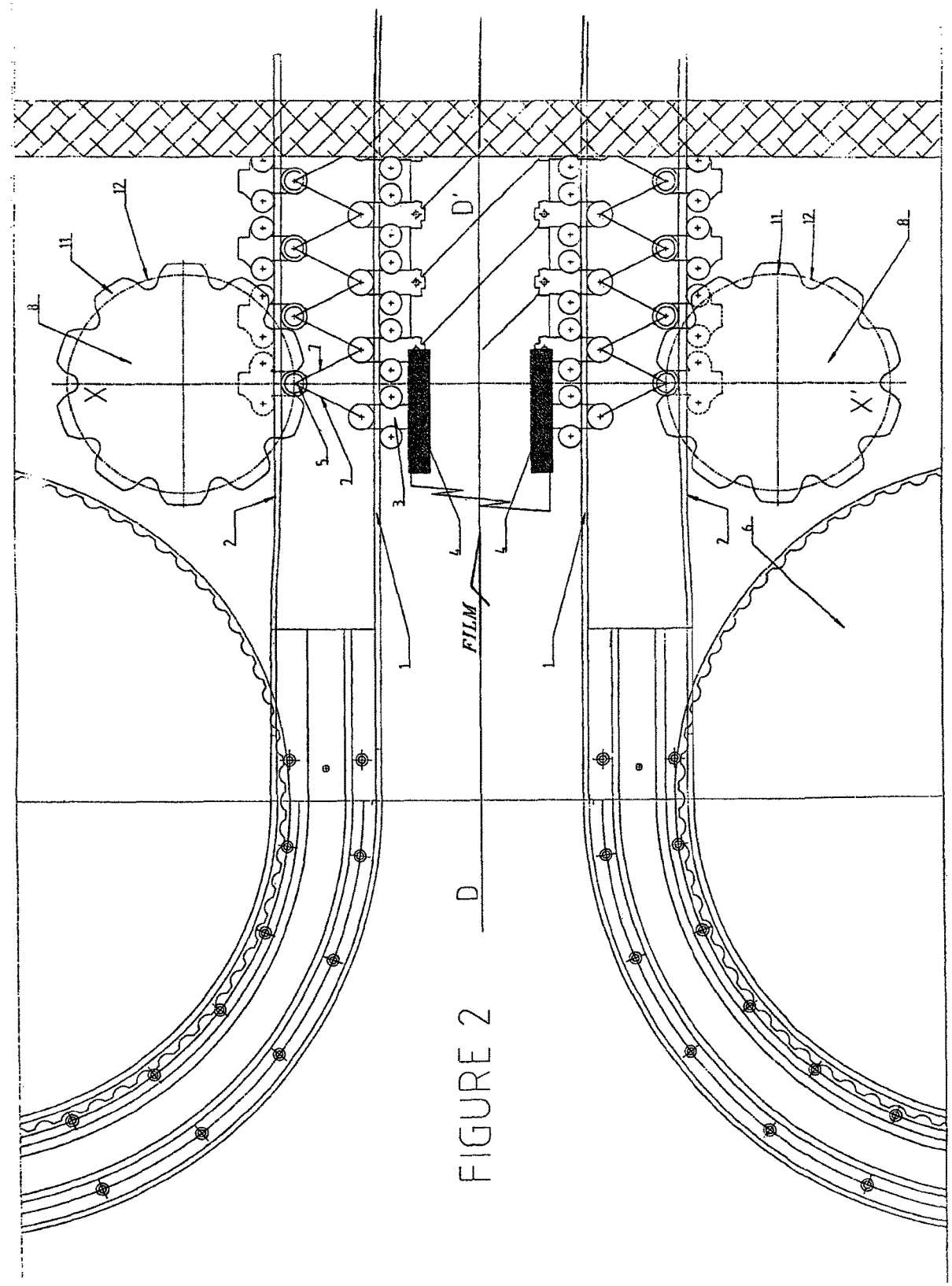
FIG. 2 is a plan view of an indexing wheel.

FIG. 2 is a plan view of an indexing wheel which can be adapted to a variation of clip pitches of 90 to 160 mm. (Example of a wheel 10 with teeth 11 separated by tooth gaps 12).

Figure 3:
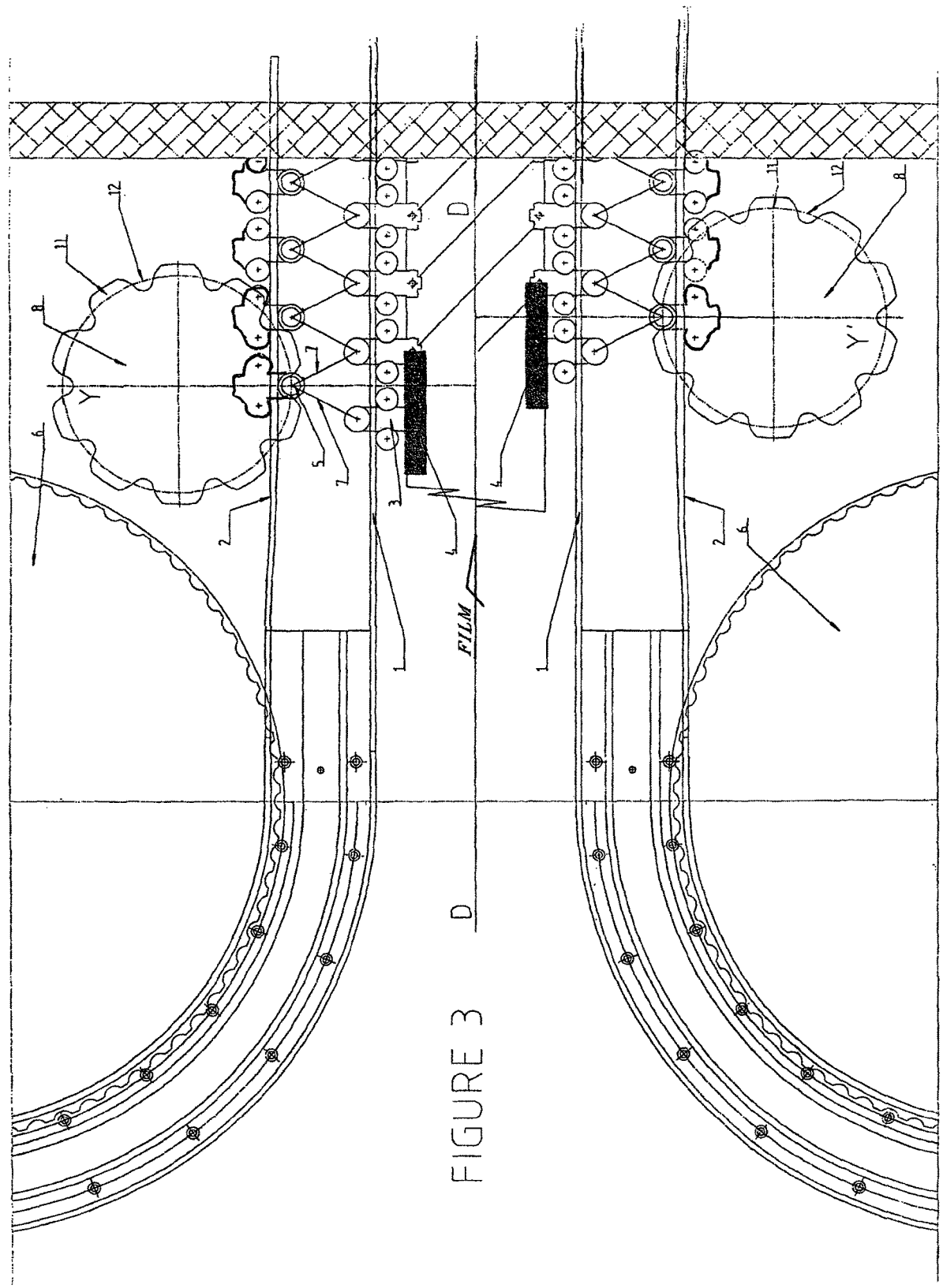
FIG. 3 is a view of a variant according to FIG. 1.

FIG. 3 is a schematic view according to the invention in which the two indexing wheels are offset in the direction to the right D, D' whereas in FIG. 1 the diameters of these wheels perpendicular to direction D, D' are aligned.

The invention claimed is:

1. Machine for stretching films, comprising two tracks each having a first rail (1) on which a multitude of clips (3) move and close together at a point for adjusting their pitch and a second rail (2) on which carriages (5) each having a roller move, wherein that the carriages are articulated, in a chain driven in a direction of movement by a toothed drive wheel (6) driven at a peripheral speed, such that each carriage (5) is articulated with two consecutive clips of the multitude of clips (3) respectively, the machine having a mechanism for indexing a pitch adjusting point of the clips (3), wherein the indexing mechanism is formed on the one hand by a toothed indexing wheel (8), arranged downstream of the drive wheel in a section of the machine where the clips engage the film in the direction of movement of the chain and driven at the same peripheral speed as the drive wheel (6), and on the other hand by the rollers of the carriages (5) entering into a tooth gap of the indexing wheel (8) when the clip, further downstream in the direction of movement of the chain and corresponding to said carriage, is at the point for adjusting the pitch of the clips.

2. Machine for stretching films according to claim 1, characterised in that the machine has two toothed indexing wheels and in that the diameters of the two wheels, perpendicular to the rails, are colinear.

3. Machine for stretching films according to claim 2, characterised in that the machine has two toothed indexing wheels and in that the two toothed indexing wheels are offset relative to one another in the direction of movement of the chain.

4. Machine for stretching films according to claim 1, characterised in that the toothed indexing wheel has at least 8 teeth.

5. Machine for stretching films according to claim 2, characterised in that the two toothed indexing wheels each have at least 8teeth.

6. Machine for stretching films according to claim 3, characterised in that the two toothed indexing wheels each have at least 8teeth.

* * * * *